(No Model.)
J. P. WARNER.
PURIFIER AND HEATER FOR FEED WATER.
No. 330,758. Patented Nov. 17, 1885.
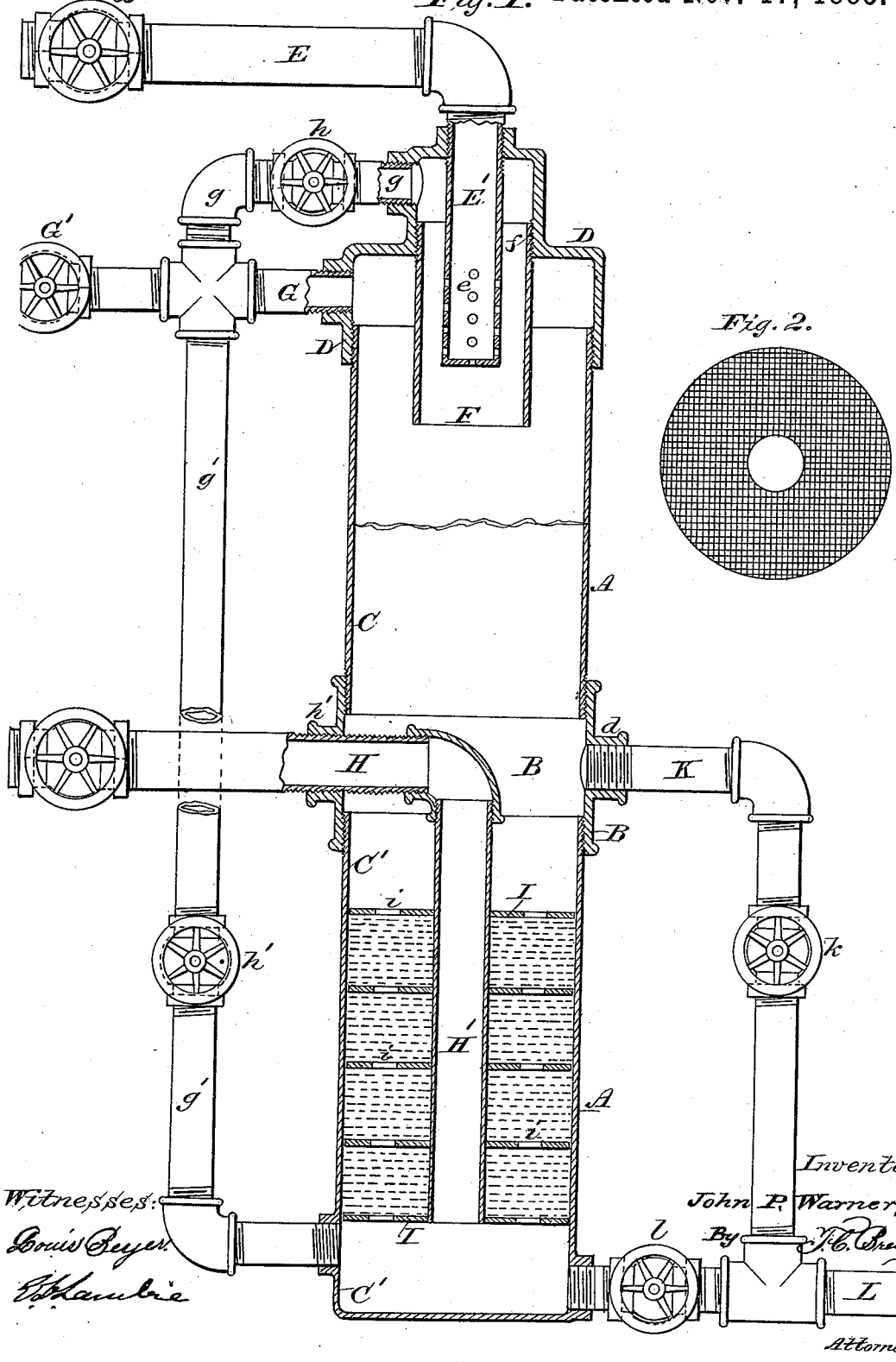
Witnesses:
Inventor,
John P. Warner,
By _____ Attorney

United States Patent Office.

JOHN P. WARNER, OF PHILADELPHIA, PENNSYLVANIA, ASSIGNOR OF FIVE-EIGHTHS TO EDWARD L. LAMBIE, OF WASHINGTON, DISTRICT OF COLUMBIA, AND JOHN F. DEZENDORF, OF NORFOLK, VIRGINIA.

PURIFIER AND HEATER FOR FEED-WATER.

SPECIFICATION forming part of Letters Patent No. 330,758, dated November 17, 1885.

Application filed April 20, 1885. Serial No. 162,797. (No model.)

*To all whom it may concern:*

Be it known that I, JOHN P. WARNER, a citizen of the United States, residing at Philadelphia, in the county of Philadelphia and State of Pennsylvania, have invented certain new and useful Improvements in Combined Purifier and Heater for Feed-Water of Boilers; and I do hereby declare the following to be a full, clear, and exact description of the invention, such as will enable others skilled in the art to which it appertains to make and use the same.

My invention relates to improvements in combined feed-water purifier and heater for steam-boilers; and the object is to produce an apparatus by which the feed-water to be used in boilers is thoroughly purified of all the impurities which produce sediment and scale, and which thereby greatly reduce the evaporative efficiency of the boiler; also, to heat the feed-water before entering the boiler, and thus increasing its efficiency; furthermore, to produce devices in connection with the apparatus by which the particles or impurities rising to the surface of the water while it is boiling, and which, when they settle in the cooled water, produce scale, can be readily blown out of the apparatus by a surface blow-off, while those that have accumulated at the bottom can also be blown off whenever desired.

The invention consists in the peculiar construction of parts and arrangement of details, as will be more fully described hereinafter, and more specially pointed out in the claims, reference being had to the accompanying drawings and the letters of reference marked thereon.

Like letters indicate similar parts in the different figures of the drawings, in which—

Figure 1 represents a vertical cross-section, partly in elevation, of my improved apparatus. Fig. 2 is a detail view of one of the wire-gauze strainers.

In the drawings, A represents the main chamber or vessel of the apparatus, made in this instance, by preference, of a central piece, B, the two cylindrical pieces C and C', and the removable head D, which is screwed onto the piece C. By making the vessel in this manner the interior can be very easily reached and examined or repaired. The head D has the reduced end D', to which the water-inlet pipe E is attached, leading from a pump or other source of supply, and terminates in a jet-nozzle, E', provided with perforations $e$. A suitable valve, $a$, regulates the water-supply. A pipe, F, surrounds this nozzle, and is screwed into the inner side of the end D', as seen at $f$, and forms a shield to prevent the spreading of the water-jets. At one side of the head D is attached the steam-pipe G, having valve G', and leads from the boiler, and has a branch pipe, $g$, provided with a valve, $h$. This branch pipe forms, with pipe F, an annular steam-jet around the nozzle, and not only assists in heating the water, but also creates a vacuum to draw the water into the apparatus. Another branch pipe, $g'$, with valve $h'$, leads to the bottom of the vessel A, and will be referred to hereinafter.

The feed-pipe H, leading to the boiler, is screwed into a branch, $b$, of the T-piece and extends inward. To its inner end is screwed an elbow and pipe, H', which passes downward toward the bottom of the vessel. Around this pipe H' are arranged a series of diaphragms, I, having one or more rows of holes, $i$, and between said diaphragms is placed any suitable filtering material, although I prefer to use a series of layers of fine wire-gauze, as shown in Fig. 2. Opposite the branch $b$ of the T-piece is placed another branch, $d$, to which the surface blow-off pipe K is attached, being provided with a valve, $k$. Said pipe K connects with the bottom blow-off pipe, L, having a valve, $l$, and leading to any desirable place. A suitable water-gage may be applied to the vessel A to indicate the position of the water both in it and the boiler, being so placed as to show the water-level in both.

The operation is as follows: The proper connections having been made with the water-supply, steam-boiler, &c., the water will enter the vessel A through the jet E', meeting the steam through pipe $g$, by which it is heated. It will then pass through the series of diaphragms and filtering material, and will be forced through the pipe H' into the boiler in a purified and heated state. If it is desired at any time to blow out the impurities and sediment-producing particles in the vessel A, they can be blown from the surface by closing the valve $l$, opening the valve $k$, and also closing the valves $a$, $h$, and $h'$, and if it is desirable to blow out the sediment, &c., from the bottom of the vessel A the valve $k$ should be closed and valve $l$ be opened, the other valves remaining as before.

It will be readily seen that this apparatus furnishes a reliable purifier and heater for the feed-water of boilers, it is not liable to get out of order, it creates a perfect circulation of water, it can be readily cleaned of foam, which is generally impure, or other impurities on the surface of the water in the vessel or at its bottom, it can be entirely produced of the usual pipe-fittings now in the market, excepting the removable head, and no extra screw-threads or fitting is necessary.

I am aware that an upper cylinder having a slot in its side is old; but this would not accomplish the object I have in view—to prevent spraying of the water; but,

Having thus described my invention, what I claim, and desire to secure by Letters Patent, is—

1. In a heater for feed-water, the removable head having jet-nozzle surrounded by a closed shield, F, secured to said head, as shown, in combination with a vessel, A, containing diaphragms and filtering material, with steam-pipes and feed-pipes, all arranged substantially as specified.

2. In a feed-water heater and purifier, the vessel A, consisting of a T-piece, B, the cylindrical pieces C C', and removable head D, with connections for steam and water pipes, substantially as set forth.

3. The combination of the vessel A, constructed as shown, with jet-nozzle E', shield F, steam-pipe G, with its branches, and feed-pipe H, all arranged substantially as and for the purpose specified.

4. The combination of a vessel, A, constructed as shown, the perforated jet-nozzle E', the shield F, steam-pipe G, and branches $g\ g'$, and the feed-pipe H, arranged to pass upward through the diaphragms I, with the surface and bottom blow-off pipes, all substantially as specified.

5. In a feed-water heater and purifier, the combination of water and steam supply pipes, the feed-pipe, and the surface and bottom blow-off pipes connected to a vessel having T-piece B, cylindrical parts C C', and removable head D, all constructed and arranged substantially as and for the purpose set forth.

In testimony whereof I affix my signature in presence of two witnesses.

JOHN P. WARNER.

Witnesses:
LOUIS BEYER,
E. L. LAMBIE.